United States Patent [19]
Wright

[11] 3,778,815
[45] Dec. 11, 1973

[54] KEYBOARD ENCODER

[75] Inventor: Carl Macey Wright, Cinnaminson, N.J.

[73] Assignee: RCA Corporation, New York, N.Y.

[22] Filed: May 17, 1971

[21] Appl. No.: 143,860

[52] U.S. Cl. .......... 340/365 S, 197/98, 340/347 DD
[51] Int. Cl. .......... G06f 3/02
[58] Field of Search .......... 340/365, 347 DD; 235/155

[56] References Cited

UNITED STATES PATENTS

| | | | |
|---|---|---|---|
| 2,610,243 | 9/1952 | Burkhart et al. | 340/365 UX |
| 3,307,148 | 2/1967 | Fukamachi | 340/365 UX |
| 3,541,547 | 11/1970 | Abramson et al. | 340/365 UX |

*Primary Examiner*—Thomas B. Habecker
*Assistant Examiner*—Robert J. Mooney
*Attorney*—H. Christoffersen

[57] ABSTRACT

Circuit with reduced maximum number of signal terminals per logic gate (reduced "fan-in") for translating the selection of a key into an n bit binary code. It includes a plurality of logic gates receptive of $q$ of n timing pulses for applying signals indicative of binary digits (bits) through a selected key in one direction and a plurality of logic gates receptive of the remaining $p$ timing pulses for applying such signals through the selected key in the opposite direction. A signal, after passing through a key, is gated through one of two logic circuits under the control of the same timing pulse employed to produce the signal, to a common output terminal.

4 Claims, 3 Drawing Figures

INVENTOR.
Carl M. Wright
BY
ATTORNEY

INVENTOR.
Carl M. Wright
BY Samuel Cohen
ATTORNEY

INVENTOR.
Carl M. Wright
BY Samuel Cohen
ATTORNEY

KEYBOARD ENCODER

BACKGROUND OF THE INVENTION

FIG. 1 shows a known circuit for translating the depression of a key into a four bit code representing the key character. The keys, lengended 0 through 9 and A through F, are shown at the upper left of FIG. 1. The circuit includes six OR gates 20 through 25 and four AND gates 30 through 33.

In operation, when a key is depressed, the OR gate 20, which is connected either directly, or through one of the four OR gates 21 through 24, to each key, produces an output NK = 1. For example, when the key 7 is depressed, the OR gates 22, 23 and 24 are all enabled, each applies a signal indicative of the bit 1 (+V) to the OR gate 20, and the OR gate 20 produces an output NK =1.

For purposes of this discussion, it may be assumed that in response to the NK = 1 signal, a timing pulse generator (not shown) is activated and it produces the four successive output pulses T1, T2, T3 and T4 during four non-overlapping time periods. In this same example, namely the depression of the key 7, in response to the timing pulses T1, T2 and T3, the AND gates 33, 32 and 31 are enabled, in that order, and the OR gate 25 produces three successive KB = 1 signals. The last OR gate 21 is not enabled in response to the depression of key 7 so that when pulse T4 occurs, the AND gate 30 remains disabled and the OR gate 25 produces an output KB = 0.

The table which follows describes the operation of the circuit for all 16 keys.

| CHARACTER | CODE $2^3$ | $2^2$ | $2^1$ | $2^0$ | KB AT TIME T1 | T2 | T3 | T4 |
|---|---|---|---|---|---|---|---|---|
| 0 | 0 | 0 | 0 | 0 | 0 | 0 | 0 | 0 |
| 1 | 0 | 0 | 0 | 1 | 1 | 0 | 0 | 0 |
| 2 | 0 | 0 | 1 | 0 | 0 | 1 | 0 | 0 |
| 3 | 0 | 0 | 1 | 1 | 1 | 1 | 0 | 0 |
| 4 | 0 | 1 | 0 | 0 | 0 | 0 | 1 | 0 |
| 5 | 0 | 1 | 0 | 1 | 1 | 0 | 1 | 0 |
| 6 | 0 | 1 | 1 | 0 | 0 | 1 | 1 | 0 |
| 7 | 0 | 1 | 1 | 1 | 1 | 1 | 1 | 0 |
| 8 | 1 | 0 | 0 | 0 | 0 | 0 | 0 | 1 |
| 9 | 1 | 0 | 0 | 1 | 1 | 0 | 0 | 1 |
| A | 1 | 0 | 1 | 0 | 0 | 1 | 0 | 1 |
| B | 1 | 0 | 1 | 1 | 1 | 1 | 0 | 1 |
| C | 1 | 1 | 0 | 0 | 0 | 0 | 1 | 1 |
| D | 1 | 1 | 0 | 1 | 1 | 0 | 1 | 1 |
| E | 1 | 1 | 1 | 0 | 0 | 1 | 1 | 1 |
| F | 1 | 1 | 1 | 1 | 1 | 1 | 1 | 1 |

The disadvantage of the circuit of FIG. 1 is that each of the OR gates 21 through 24 requires eight input signal terminals (a "fan-in" of 8). Standard commercially available logic packages normally have gates with a maximum of four input signal terminals each. So-called "expanders"may be employed for additional input signals. (An expander may be a second four input gate but without a load resistor and its output terminal may be connected, in common, to the load resistor for the first four input gate.)

Using standard logic packages that are commercially available, about seven, 14-pin "dual in line" packages (DIP's) would be required for the circuit of FIG. 1. If instead the circuit were implemented with diodes and if each input lead to a gate is considered to require a diode, a total of 49 diodes would be needed. In practice, as the leads from keys 1, 2, 4 and 8 do not cross-couple to any other lead, the diodes for these leads may be eliminated so that the circuit would need only 45 diodes.

SUMMARY OF THE INVENTION

In response to the closing of a switch means and the reception of a timing pulse $T_i$ of a group $p$ of said pulses, a signal is applied to a first terminal of said switch means for passage in one direction through the switch means to a first logic gate. The same pulse $T_i$ is employed to gate said signal to a common output terminal. In response to the reception of a timing pulse $T_j$ of a group q of said pulses, a signal is applied to a second terminal of the switch means for passage therethrough in the opposite direction to a second logic gate. The same pulse $T_j$ is employed to gate the last-named signal to the common output terminal. The groups $p$ and $q$ of pulses are mutually exclusive; $p+q=n$; and $p$ optimally is as close in value as possible to $q$.

DETAILED DESCRIPTION

Figure 2:
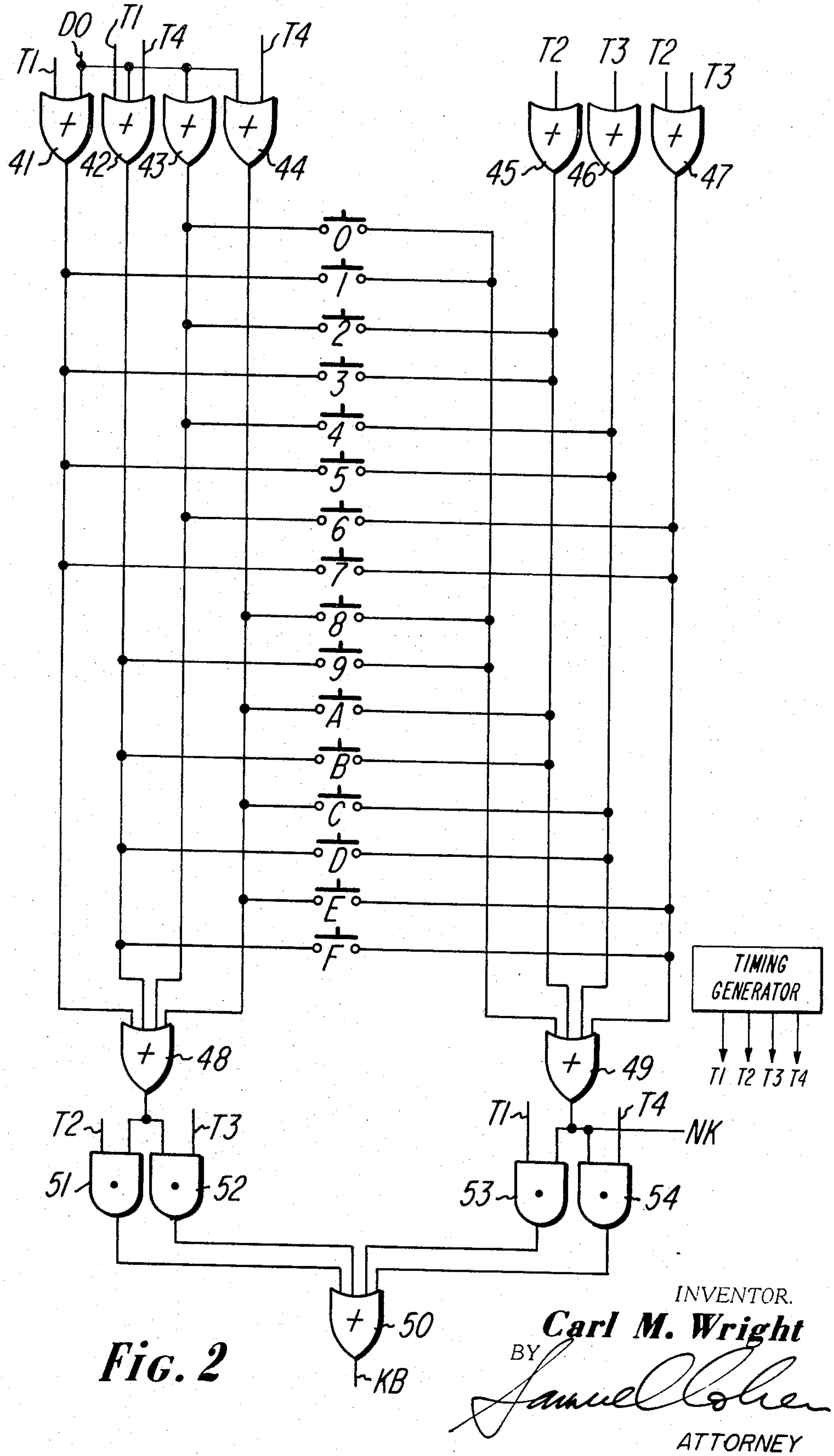
FIG. 2 is a block diagram of an improved encoder according to one embodiment of the invention.

The encoder of the embodiment of the invention shown in FIG. 2 includes seven OR gates 41–47 at the input circuit of the encoder and three OR gates 48, 49 and 50 at the output circuit of the encoder. The OR gate 48 is connected to two AND gates 51 and 52, and the OR gate 49 is connected to two AND gates 53 and 54.

The switches shown schematically at the center of FIG. 2 comprise the keyboard. It is to be understood that the switches or keys shown are intended only to be representative; many alternatives are possible and within the scope of the invention. As contrasted to the prior art circuit in which one terminal of each key is connected, in common, to the power supply voltage +V, the keys of the FIG. 2 arrangement are interconnected to the input OR gates in such a way that they may pass current in either direction. The important advantage of this arrangement is that the fan-in is substantially reduced. The maximum fan-in to an OR gate is four, as contrasted to the eight of FIG. 1. The circuit employs about four and a half DIP's if implemented with standard logic packages contrasted with the approximately seven DIP's of FIG. 1. It employs only thirty two diodes, if implemented with diodes, compared to the forty five of FIG. 1.

Figure 1:
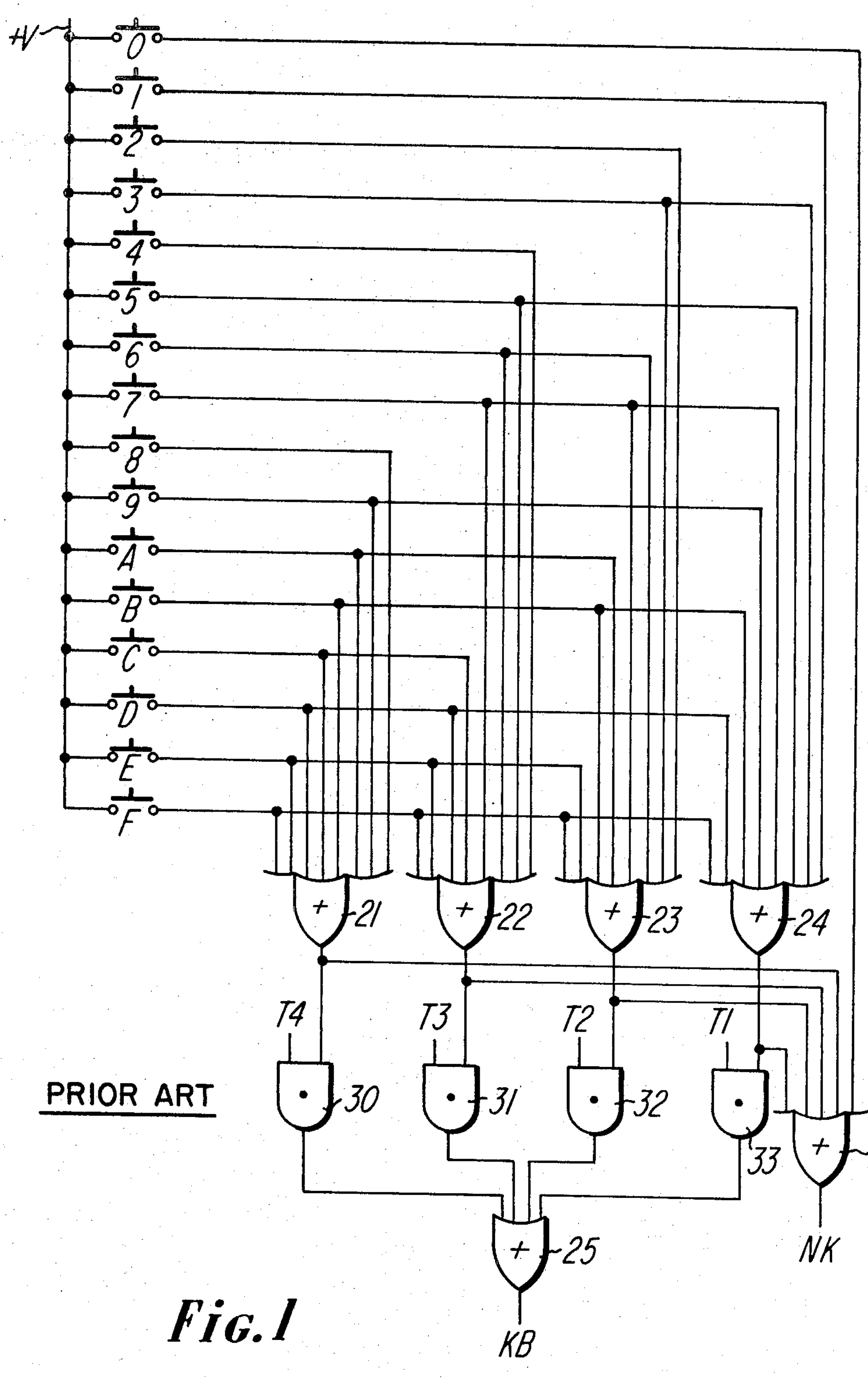
FIG. 1 is a block diagram of a prior art encoder.

Of course, FIGS. 1 and 2 are merely representative. There may be more or fewer keys in either FIGURE but this does not change the principle involved.

The table given in the Background of the Invention section is applicable also to the operation of the encoder of FIG. 2. In response to the depression of any key, such as 7, and the occurrence of a signal DO, the OR gate 49 is actuated and produces an output NK = 1. The signal D0 may be a periodic signal produced in the control area of the computer, such as a desk top calculator, of which the present invention is a part. For purposes of the present discussion, it may be considered that the signal NK is applied to a timing pulse generator (not shown) and that the latter, upon termination of the signal D0, generates the four successive non-overlapping timing pulses T1, T2, T3 and T4.

Assume now that the key actually depressed is the seven key and that the timing pulses start. In response to the timing pulse T1, the OR gates 41 and 42 are enabled. The OR gate 41 applies a signal indicative of a 1 (hereafter termed simply a 1) in one direction through the 7 key to the OR gate 49 which is thereby enabled and applies a 1 to the AND gates 53 and 54. In response to the first timing pulse T1, the AND gate 53 is primed. The 1 from the OR gate 49 therefore enables the AND gate 53 and the latter causes the OR gate 50 to produce an output signal KB = 1.

The enabled OR gate 42 connects to keys 9, B, D and F. As they are all open, however, the 1 produced by the gate 42 has no effect on the encoder operation at this time.

In response to the next timing pulse T2, the OR gates 45 and 47 become enabled. The OR gate 47 applies a 1 through the 7 key in the opposite direction to that discussed above. This signal enables the OR gate 48 which applies a 1 to the AND gates 51 and 52. The timing pulse T2 has primed the AND gate 51 so that the 1 it receives from the OR gate 48 enables gate 51. The AND gate 51 applies a 1 to the OR gate 50 and the latter produces an output KB = 1.

The enabled OR gate 45 connects to keys 2, 3, A and B. As they are all open, the 1 produced by the OR gate 45 has no effect on the encoder operation when the 7 key is closed.

In response to the timing pulse T3, the OR gates 47 and 46 are enabled. The former applies a 1 through the 7 key to the OR gate 48. The AND gate 52 is primed by T3. Therefore, the enabled OR gate 48 primes the AND gate 52 which produces a 1 output. This appears as KB = 1 at the output terminal of the OR gate 50.

The enabled OR gate 46 connects to keys 4, 5, C and D. As they are all open, however, the OR gate 46 does not affect the encoder operation when the 7 key is closed.

In response to the last timing pulse T4, both OR gates 42 and 44 are enabled, but neither one of these gates connects to the 7 key. The enabled OR gates 42 and 44 do apply a 1 to the OR gate 48 which applies a 1 to the AND gates 51 and 52. As T2 and T3 are both 0, however, neither AND gate becomes enabled.

The enabled OR gate 42 connects to keys 9, B, D and F but these keys are open so that no signal flows through any of these keys to the OR gate 49. Similarly, the OR gate 44 connects to keys 8, A, C and E; however, these keys are all open. Accordingly, no signal flows through any of these keys to the OR gate 49. The OR gates 45, 46 and 47 are all disabled and therefore none of these gates apply a 1 to the OR gate 49. As a result, the OR gate 49 remains disabled and applies a disabling signal to the AND gates 53 and 54. Therefore, the output OR gate 50 produces an output KB = 0.

Summarizing the operation above, when the 7 key is depressed, the four bit character 1110 is produced, in that order, at the KB output, where the first produced bit is the least significant bit and the last produced bit is the most significant bit. An analysis similar to this can be made for all other keys.

Figure 3:
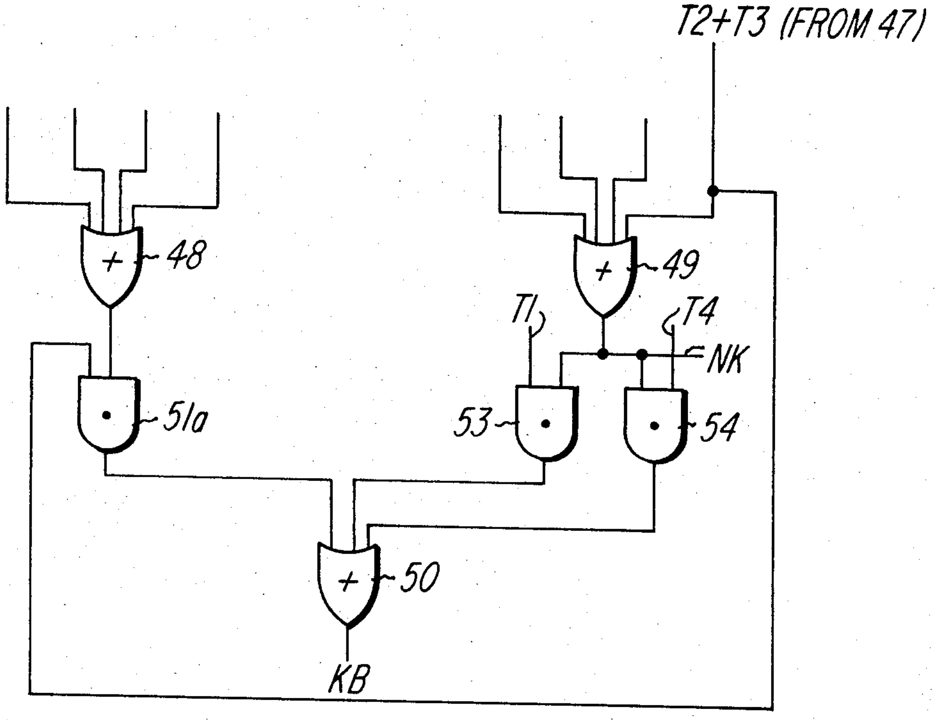
FIG. 3 is a block diagram of a portion of a somewhat simplified version of the encoder of FIG. 2.

The circuit of FIG. 2 can be simplified in the manner shown in FIG. 3. The two AND gates 51 and 52 of FIG. 2 are replaced with a single AND gate 51*a*. The latter receives one input signal from the OR gate 48 and its second input signal from the OR gate 47 (see FIG. 2). This last signal is T2 + T3. No other changes need be made in the circuit. There is a saving of one AND gate and a reduction from a four-input OR gate to a three-input OR gate.

The AND gates 53 and 54 similarly may be replaced by a single AND gate which receives as its second input the output of the OR gate 42 (D0 + T1 + T4). However, here the means receptive of KB must be inhibited during the interval of D0 as in response to D0 = 1, an output KB = 1 will be produced.

The invention has been illustrated in terms of a 16-key keyboard in which the depression of any key is translated into a four bit code. As already mentioned, however, the invention is perfectly general and may be considered in the following way. In the prior art encoder of FIG. 1 for producing an n bit code, the maximum fan-in needed is $2^{n-1}$. For the invention of the present application, as illustrated in FIG. 2, the number of timing pulses is $n$, a group of $p$ of the timing pulses is applied via OR gates to the left terminals of the keys, and a group of $q$ of the timing pulses is applied to the right terminals of the keys, where the groups $p$ and $q$ are mutually exclusive and where $p + q = n$.

The number of OR gates in the top row of an arrangement such as shown in FIG. 2 is $2^p$ at the left and $2^q-1$ on the right. The maximum fan-in for any of these OR gates is approximately $p$ or $q$ (one of the gates may have a fan-in of $p = 1$, as the OR gate 42 of FIG. 2). The collecting OR gates 48 and 49 will have fan-ins of $2^p$ and $2^q$ respectively. It thus can be seen that in an optimum arrangement, $p$ will be as close in value to $q$ as possible. In the case in which n is an even number, as in FIG. 2, then $p = q = n/2$ in the optimum case. In the case in which n is an odd number, then $p = n + 1/2$ in the optimum case. In general, the maximum fan-in in an arrangement according to the present invention is reduced to a value approximately equal to the square root of the maximum fan-in required in the FIG. 1 arrangement.

While an arrangement according to the present invention employs more gates than the prior art arrangement, the circuit is in fact simpler than the prior art circuit. As already mentioned, regardless of the way the circuit of the present invention is implemented, it turns out that it employs fewer circuit elements than the circuit of FIG. 1. In terms of integrated circuits, as one example, the integrated circuit of FIG. 2 would require less substrate area and fewer circuit elements than the integrated circuit of FIG. 1.

What is claimed is

1. A circuit for translating the closing of one of a plurality of two terminal switch means to an n bit code comprising, in combination:

means for producing n successive timing pulses $T_1$ through $T_n$;

first and second logic gates;

means responsive to the closing of a particular one of said switch means and the reception of a timing pulse $T_i$ of a group $p$ of said pulses for applying timing pulse $T_i$ to the first terminal of said particular switch means for passage through said switch means in one direction to said first logic gate for activating that gate;

output terminal means;

means responsive to the same timing pulse $T_i$ and to said activated first logic gate for applying a signal to said output terminal means;

means responsive to the closing of said particular switch means and the reception of a timing pulse $T_j$ of a second group $q$ of said pulses for applying timing pulse $T_j$ to the second terminal of the switch means for passage through said switch means, in a direction opposite to that taken by pulse $T_i$, to said second logic gate for activating the latter, where $p + q = n$ and the groups $p$ and $q$ are mutually exclusive; and means responsive to the same timing pulse $T_j$ and to said activated second logic gate for applying a signal to said output terminal means.

2. A circuit as set forth in claim 1, where $n$ is an even number and $p = q$.

3. A circuit as set forth in claim 1 where $n$ is an odd number and $p = q + 1$.

4. A circuit as set forth in claim 1 further including:

means receptive of control pulses; and means responsive to the closing of any switch means and to the reception of one of said control pulses for producing an output signal to indicate that a switch means has been closed.

* * * * *